United States Patent
Okazaki et al.

(10) Patent No.: US 6,331,344 B1
(45) Date of Patent: Dec. 18, 2001

(54) BIAXIALLY ORIENTED POLYESTER FILM

(75) Inventors: Iwao Okazaki, Kyoto; Yukari Nakamori; Shozi Nakajima, both of Shiga; Akira Kubota; Yuri Shirakawa, both of Shiga, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/319,198

(22) PCT Filed: Jun. 12, 1998

(86) PCT No.: PCT/JP98/02590

§ 371 Date: Aug. 16, 1999

§ 102(e) Date: Aug. 16, 1999

(87) PCT Pub. No.: WO99/17931

PCT Pub. Date: Apr. 15, 1999

(30) Foreign Application Priority Data

Oct. 3, 1997 (JP) .................................................. 9-271343
Feb. 16, 1998 (JP) ................................................. 10-033059

(51) Int. Cl.[7] .......................... B32B 27/08; B32B 27/20; B32B 27/36
(52) U.S. Cl. ........................ 428/141; 428/213; 428/215; 428/323; 428/343; 428/344; 428/480; 428/694 ST; 428/694 SG; 428/910; 525/437; 525/444
(58) Field of Search ..................................... 428/141, 323, 428/213, 215, 216, 480, 910, 694 SG, 694 ST, 343, 344; 525/437, 444

(56) References Cited

U.S. PATENT DOCUMENTS

| 4,454,312 | * | 6/1984  | Kuze et al.       | 528/275 |
| 4,687,699 | * | 8/1987  | Hensel et al.     | 428/213 |
| 4,687,700 | * | 8/1987  | Hensel et al.     | 428/213 |
| 4,781,963 | * | 11/1988 | Utsumi et al.     | 428/141 |
| 5,183,623 | * | 2/1993  | Kawaguichi et al. | 264/544 |
| 5,670,236 | * | 9/1997  | Kotani et al.     | 428/141 |
| 5,858,507 | * | 1/1999  | Yoshida et al.    | 428/141 |

FOREIGN PATENT DOCUMENTS

| 1-195045A | 8/1989  | (JP) . |
| 6-9809A   | 1/1994  | (JP) . |
| 7-266521A | 10/1995 | (JP) . |

OTHER PUBLICATIONS

Schmitz, Peter et al., "Films." Ullmann's Encyclopedia of Industrial Chemistry, 5th Ed., vol. A11, pp. 85–95, 1988.*

* cited by examiner

*Primary Examiner*—Vivian Chen
(74) *Attorney, Agent, or Firm*—Birch, Stewart, Kolasch & Birch, LLP

(57) ABSTRACT

According to the present invention, a biaxially oriented polyester film is provided which comprises at least one film layer composed predominantly of polypropylene terephthalate and has a heat shrinkage of 0.8% or below after standing at 80° C. for 30 minutes. This film is excellent in wear resistance and hence useful particularly for magnetic recording media.

20 Claims, No Drawings

BIAXIALLY ORIENTED POLYESTER FILM

This application is the national phase under 35 U.S.C. §371 of PCT International Application No. PCT/JP98/02590 which has an International filing date of Jun. 12, 1998, which designated the United States of America.

TECHNICAL FIELD

This invention is directed to biaxially oriented polyester films.

BACKGROUND ART

As biaxially oriented polyester films, a biaxially oriented laminated polyester film is known (for instance, U.S. Pat. Nos. 5,069,962 and 5,626,942). There is also known a biaxially oriented polypropylene terephthalate film (Japanese Unexamined Patent Publication No. 9-175055 for example).

Such a commonly known, biaxially oriented polyester film when in use for magnetic recording media affords improved electromagnetic conversion characteristics, but leaves the problem that polymer particles become escaped due to insufficient wear resistance of the polymer surface, eventually inviting particle dusting. Upon application to magnetic tapes, this type of polyester film involves the lack of signals which would result from particle dusting. In magnetic recording media of a higher density, a need exists for those physical characteristics that could prevent polymer particles from escaping out of the corresponding polyester film. In order to solve these problems, a principal object of the present invention is to provide a biaxially oriented polyester film which, in particular, is excellent in wear resistance and free from oligomer separation.

DISCLOSURE OF THE INVENTION

The biaxially oriented polyester film according to the present invention is so constituted as to have at least one film layer disposed, which film layer is composed predominantly of polypropylene terephthalate. A first embodiment of the polyester film lies in such having a heat shrinkage of 0.8% or below after standing at 80° C. for 30 minutes. A second embodiment of the polyester film lies in such having on at least one surface a surface roughness Ra of 5–120 nm, a 10-point average roughness Rz/Ra of 12 or below and a protrusion-to-protrusion spacing Sm of 15 $\mu$m or below.

BEST MODE OF CARRYING OUT THE INVENTION

To gain high resistance to wear and freedom from oligomer separation, the polypropylene terephthalate (hereinafter called PPT) for use in the present invention is derived preferably by polymerization of 1,3-propanediol with terephthalic acid, or a methyl ester derivative or the like thereof. A blend of two or more different polymers or a copolymer is also suitably useful so long as it has no adverse effects on achieving the object of the invention.

The PPT-predominated film layer used herein is one in which a PPT component is contained in an amount of more than 50% by weight.

The PPT-predominated film layer (hereinafter called the layer A where relevant) may be incorporated with an inorganic particle material such as of aluminum silicate, calcium carbonate, alumina, silica, calcium phosphate, titanium oxide or the like, or with an organic particle material so that the film layer is made resistant to wear. The average particle diameter of such particle material is in the range of 0.01–2.0 $\mu$m, preferably of 0.02–1.5 $\mu$m, more preferably of 0.02–1.0 $\mu$m. Further, the relative standard deviation of this particle diameter is preferably 0.5 or below, more preferably 0.3 or below, most preferably 0.2 or below. The content of that particle material is in the range of 0.01–3% by weight, preferably of 0.02–2% by weight, more preferably of 0.05–1% by weight. The layer A may be incorporated with various additives such as an antioxidant, a heat stabilizer, an ultraviolet absorber and the like in conventional amounts, provided that the object of the invention is not adversely affected.

The biaxially oriented polyester film provided by the present invention may be a single-layered film formed solely of the above-mentioned PPT-predominated film layer.

In the case where the biaxially oriented polyester film provided by the present invention is of a laminated structure in which two or more layers are superposed one on another, at least one of the constituent film layers should be formed of the PPT-predominated film layer described above. Though not particularly restricted, the other film layer or layers may preferably be formed of polyethylene terephthalate (hereinafter called PET), poly(ethylene-2,6-naphthalene dicarboxylate) (PEN) and the like. A blend of two or more different polymers or a copolymer may be used unless the object of the invention is adversely affected. These film layers can be incorporated with the same inorganic or organic particle material as noted above in connection with the layer A. Such additives as an antioxidant, a heat stabilizer, an ultraviolet absorber and the like may also be added in conventional amounts unless the object of the invention is adversely affected.

According to the first embodiment of the present invention, a biaxially oriented polyester film should have a heat shrinkage of 0.8% or below after standing for 30 minutes at 80° C. so as to prevent signals from getting lacked when in use for magnetic recording media. The heat shrinkage is preferably 0.6% or below, more preferably 0.4% or below.

The thickness of the layer A is not particularly restricted. Desirably, however, it may be set to be in the range of 0.01–3.0 $\mu$m, preferably of 0.02–2.0 $\mu$m, more preferably of 0.03–1.0 $\mu$m, in respect of the increase in wear resistance and the preclusion of oligomer separation.

No particular restriction is imposed upon the relationship between the thickness t of the layer A and the average particle diameter d of the particle material contained in the layer A. However, the wear resistance can noticeably be improved in the case of 0.2 d$\leq$t$\leq$10 d, preferably of 0.3 d$\leq$t$\leq$5 d, more preferably of 0.5 d$\leq$t$\leq$3 d. When two or more layers A are used and when two such layers are disposed for example as the outermost front and back surfaces of the finished film, those equations should preferably be satisfied.

According to the second embodiment of the present invention, a biaxially oriented polyester film should have on at least one surface a surface roughness Ra of 5–120 nm, a 10-point average roughness Rz/Ra of 12 or below and a protrusion-to-protrusion spacing Sm of 12 $\mu$m. With wear resistance in view, the surface roughness Ra is preferably in the range of 5–50 nm, especially of 10–30 nm, the 10-point average roughness Rz/Ra is preferably 10 or below, and the protrusion-to-protrusion spacing Sm is preferably 12 $\mu$m or below. The lower limit of Rz/Ra is not particularly restrictive which, however, is 4 or above for practical film production, and the lower limit of Sm is not particularly restrictive which, however, is in the order of 3 for practical film production.

Also in the second embodiment, it is desired that the relationship between the thickness t of the layer A and the average particle diameter d of the particle material contained in the layer A be observed in the same ranges as specified above in connection with the first embodiment.

In the present invention, a further embodiment is included which is designed to simultaneously comply with the requirements of the first and second embodiments. In addition and more advantageously, each of the first and second embodiments should meet the following requirements.

To increase wear resistance, to render oligomer separation free and to define surface profiling effectively, each of the biaxially oriented polyester films according to the present invention is preferably brought into a multi-layered structure in which at least two or more film layers are placed in superposed relation to one another. The crystallization parameter ΔTcg of an outermost layer-constituting polymer should be preferably lower than 60° C., more preferably lower than 50° C., especially lower than 40° C., in view of wear resistance and dimensional stability. The crystallization parameter ΔTcg is defined by the difference between the cold crystallization temperature during the course of temperature rise and the glass transition temperature. The smaller difference, the speed of polymer crystallization becomes higher with consequent arrival at a specific range of thermal shrinkage after standing for 30 minutes at 80° C. that falls within the scope of the present invention. This means that those features contemplated under the invention can also be effectively attained.

In the biaxially oriented polyester film of the present invention, the ratio of X/Y is set to be usually 5 or above from the points of view of wear resistance and traveling capability, wherein ( X) is the number of protrusions defined on the surface of the layer A, and (Y) is the number of particles contained in the layer A. The ratio of X/Y is preferably 10 or above, more preferably 50 or above. In the invention, surface protrusions may be formed from a given particle to be added to the film, or without reliance on that particle, but from a multiplicity of fine crystals of the layer A that are derived by crystallization of a layer A-constituting polymer. In such instance, the ratio of protrusion in number to particle in number might presumably be extremely high in principle as the number of particles is small, but the upper limit is around 100 tenths of thousands.

The biaxially oriented polyester film of the present invention should desirably have a Young's modulus of 4.5 GPa or above, especially 5 GPa or above, in the lengthwise and widthwise directions. The Young's modulus may be identical or different in the two directions. For example, in the case of use for magnetic recording media, insufficient modulus in the base film causes the resultant magnetic tape stretchable during traveling thereof under the influence of a tension arising from a magnetic head or a guide pin, consequently producing inadequate effects on the electromagnetic conversion characteristics (output characteristics). In magnetic recording tapes for long-playing use, improved modulus is preferable at least in either one direction since the base film is generally small in thickness.

Moreover, the ratio of Young's modulus in a lengthwise direction to that in a widthwise direction is preferably in the range of 0.7–1.5, more preferably of 0.75–1.3, especially of 0.8–1.2. Particularly in magnetic tapes using a helical scanning recording head, departures from these ranges lead to irregular contact of the tape with the head, resulting in unacceptable electromagnetic conversion characteristics.

Reference is further made to the equation of [0.08E−S] which is directed to the relationship between the modulus E (GPa) in a lengthwise direction and the thermal shrinkage S (%) in a lengthwise direction after standing for 30 minutes under the temperature conditions of 80° C. When this equation is set to satisfy 0.08 or above, also 0.09 or above, especially 0.1 or above, heat dimensional stability can be improved without modulus reduced to so an appreciable extent.

In addition, from the viewpoint of dimensional stability, a polyester composition is preferred which is made up chiefly of 60–99.9% by weight of PPT and 40–0.1% by weight of PET.

Another similar composition is also preferred which is made of 80–99.5% by weight of PPT and 20–0.5% by weight of PET, especially of 90–99.9% by weight of PPT and 10–0.1% by weight of PET. In such cases, PET is set to have an intrinsic viscosity (hereinafter called IV) of 0.6 or above, preferably of 0.65 or above. This viscosity requirement makes it effective to bring about those wear resistance, dimensional stability and surface profiling properties that should accrue inherently from the biaxially oriented polyester film of the present invention.

In the biaxially oriented polyester film of the present invention, the overall film thickness is not particularly limited. When used as a substrate for magnetic disks, however, such polyester film is formed with an overall thickness of 50–100 μm, also of 50–80 μm, especially of 60–80 μm so that good wear resistance can be obtained.

In regard to one surface layer of the biaxially oriented polyester film according to the present invention, the surface roughness Ra and the surface protrusion-to-protrusion spacing Sm are as described above in connection with the second embodiment. In further regard to the other or opposite surface layer, it is desired that the surface roughness Ra be set to be 9 nm or below, preferably 6 nm or below, and that the surface protrusion-to-protrusion spacing Sm be set to be 15 μm or below, preferably 10 μm or below. By strict observance of the two surface layers to fall within the ranges specified above, traveling capability and output characteristics can be well balanced on a high level when the resulting polyester film is applied to magnetic recording media, particularly to magnetic tapes of a digital recording system.

In the biaxially oriented polyester film according to the present invention, a laminated structure (C/A/B) of at least three layers is preferred in which a polymer layer (layer A) predominantly of PPT is put in place on at least one surface of a polymer layer (layer C) mainly of a thermoplastic resin C, and a polymer layer (layer B) mainly of a thermoplastic resin B is disposed over at least one surface of the layer A. A four-layered laminate of A/C/A/B is more preferred. A five-layered laminate of B/A/C/A/B is most preferred in respect of abrasion resistance and output characteristics.

As the thermoplastic resin C used herein, a polyester is desired, but without limitation thereto. Suitable sorts. of polyester are typified by those having contained as a chief component at least one recurring unit selected from ethylene terephthalate, ethylene α,β-bis(2-chlorophenoxy)ethane-4, 4'-dicarboxylate and ethylene 2,6-naphthalate. To enhance mechanical strength and dimensional stability, polyesters are preferred which are composed chiefly of ethylene terephthalate or ethylene 2,6-naphthalate. Particularly preferred among these polyesters is such composed chiefly of ethylene terephthalate that can be well laminated with the PPT-predominated polymer layer (A). A blend of two or more polyesters or a copolymer is acceptable on condition that the object of the present invention is not adversely affected. Additionally, a recycling polymer may be used where desired. By the recycling polymer is meant a polyester which has an amount of not less than 55 equivalent weight/ $10^6$ g of carboxylic acid bonded to the terminal and has a haze of not more than 20% as determined from the polymeric solution. A particle material may be present or absent in this polyester.

The thickness of the layer C is varied in respect of for what the corresponding polyester film is used, and hence, is not particularly restricted. With mechanical strength in view, this layer preferably has a thickness of larger than 50% of the overall film thickness. Larger than 60% is more preferable, and larger than 70% is still more preferable.

PPT used herein is as described hereinabove and may be obtained by any suitable mode of polymerization known in the art. The polymer layer (A) is disposed on at least one surface of the polymer layer (C) chiefly of a thermoplastic resin C. Preferably, upon arrangement of the polymer layer (A) on both of the surfaces of the polymer layer (C), a biaxially oriented laminated polyester film is attainable which has a separated oligomer markedly reduced in amount and has fine protrusions defined on the surface.

The polymer layer (A) used herein is formed from a PPT polymer with an IV of preferably 0.8 or below, more preferably 0.9 or above. The upper limit of IV is not particularly restrictive, but is usually at about 2.0 or below such that lamination is possible with sufficient uniformity and small thickness. The above IV values of PPT ensure not only thin uniform lamination of the polymer layer (A) with the polymer layer (C) chiefly of a thermoplastic resin C, but also elimination of such defects as oligomer separation, abresion resistance and the like.

As the thermoplastic resin B used herein, polyester is desired though not limited thereto. Suitable sorts of polyester are typified by those having contained as a main component at least one recurring unit selected from ethylene terephthalate, ethylene α,β-bis(2-chlorophenoxy)ethane-4, 4'-dicarboxylate and ethylene 2,6-naphthalate. To improve mechanical strength and dimensional stability, polyesters are preferred which are composed of ethylene terephthalate or ethylene 2,6-naphthalate as a main component. Particularly preferred is a polyester composed of ethylene terephthalate as a main component since it is suited for formation of a film laminated with the polymer layer of PPT.

The polymer layer (B) is substantially free of a particle material from the viewpoint of abrasion resistance. However, this polymer layer may contain a particle material in an amount of less than 0.5% by weight so long as the particle has a particle diameter of less than 0.6 $\mu$m, preferably of 0.1 $\mu$m or below. When wear resistance is taken in view, suitable particles are chosen from aluminum silicate, alumina, silica and the like, but without limitation thereto. These particles may be used in combination.

The thickness (Ta) of the polymer layer (A) is preferably less than 1 $\mu$m, more preferably less than 0.8 $\mu$m, especially less than 0.5 $\mu$m. More than 1 $\mu$m in thickness in the polymer layer (A) invites impaired stretchability when in the production of a biaxially oriented laminated polyester film, thus causing stretch-broken film.

The ratio of thickness (Ta) of the polymer layer (A) to thickness (Tb) of the polymer layer (B) is set to meet the following requirements.

$$0.01 \leq Tb/Ta < 1$$

More preferably, $$0.03 \leq Tb/Ta < 0.5$$

Especially preferably, $$0.1 \leq Tb/Ta < 0.3$$

This thickness ratio of the two polymer layers permits those surface protrusions resulting from the PPT crystals on the surface of the polymer layer (A) to define (trace) on the surface layer of the polymer layer (B) having an extremely small thickness. Larger thickness ratios of the polymer layers than the specified range fail to trace the PPT crystal-induced protrusions of the polymer layer (A) on to the surface of the polymer layer (B). This is responsible for increased friction coefficient andhence for reduced traveling capability and diminished abrasion resistance.

Conversely, smaller thickness ratios of the polymer layers than the specified range make it impossible to uniformly laminate the polymer layer (B), inviting broken laminate (not laminated in part) and hence spotted laminate. This renders the finished laminated film less resistant to rubbing, and moreover, allows PPT crystal-induced protrusions to appear on the surface of the polymer layer (B). The protrusions in turn make the corresponding film tacky during running of the latter on a heating roll at a stage of film formation, producing poor surfacing. The thickness of the polymer layer (B) to be laminated is not particularly limited so long as it is set to be inside the range specified above. From the viewpoints of traveling capability, abrasion resistance and oligomer preclusion, 0.5 $\mu$m or below is preferable. Where the outermost two, front and back, surface layers of the finished laminated film are formed of the polymer layer (B), these surface layers may be set to be of the same or different thickness. The surface roughness of the layer B can be controlled as desired upon adjustment of the thickness of such polymer layer to be laminated.

The polymer layer (B) has a multiplicity of fine protrusions defined on the surface. The protrusions on the surface of the layer B should be derivable, in view of abrasion resistance, preferably from the PPT crystals of the polymer layer (A). Addition of a particle material causes objectionable voids to take place. In the film of the present invention, surface protrusions are defined by those crystals deposited from a polymer itself of the layer A with the result that the voids can be decreased to a great extent. Thus, these protrusions are less susceptible to breakage so that wear resistance can be improved with rubbing dust, drop out and the like alleviated.

The biaxially oriented polyester film of the present invention will find many applications, for example, to magnetic recording media, packaging materials, and cards such as prepaid cards. This polyester film is also suitably applicable as a biaxially oriented polyester film for use in digital videotapes in which higher output is required, and is further useful for data storage in computers and the like.

In the biaxially oriented laminated polyester film of the present invention, an adhesion-facilitating layer or adhesive layer may be disposed on either one or both of the outer surface thereof. Resins useful in the adhesive layer are chosen, though not limited, from polyester resin, acrylic resin, polyurethane resin and the like, but without limitation thereto, which are highly adhesive property to a layer composed predominantly of PPT.

The polyester resin used herein has an ester bond attached to the main chain or side chain thereof. This resin is derivable from polycondensation of an acid component with a glycol component.

When being used in the form of a coating liquid, the polyester resin may preferably be copolymerized with a compound containing a basic group of sulfonic acid or a compound containing a basic group of carboxylic acid so that the polyester resin is made highly adhesive to various paints and inks, or is made easily soluble in water.

As the polyester resin, a modified polyester copolymer can also be used which includes a block copolymer and a graft copolymer, both being derived by modification with acrylic, urethane, epoxy or the like.

As the acrylic resin used herein, a modified acrylic copolymer is suited which includes a block copolymer or a graft copolymer, both being derived by modification with polyester, urethane, epoxy or the like.

As the polyurethane resin used herein, such a resin as being structured to have a urethane bond in the molecule is suited but with no limitation placed thereon. This resin is basically constituted of a reaction product obtained from a polyol compound and an isocyanate compound and may be incorporated with a chain extender and the like where needed.

The chain extender used herein is chosen from ethylene glycol, diethylene glycol, propylene glycol, trimethylolpropane, hydrazine, ethylenediamine, diethylenetriamine and the like.

The adhesive layer may be incorporated with other different resins such as epoxy resin, silicone resin, urea resin, phenol resin and the like, but to an extent not to impair the beneficial effects of the present invention. There may also be added various additives such as, for example, an antioxidant, a heat stabilizer, a weathering agent, an ultraviolet absorber, a lubricant, a pigment, a dye, an organic or inorganic fine particle, a filler, an antistatic agent, a nucleating agent and the like.

Although the particle materials and crosslinking agents are added at will to the adhesive layer, these additives contribute to improvements in lubrication, blocking resistance, and adhesion to various paints and inks.

The particle material optionally incorporated in the adhesive layer is chosen from silica, colloidal silica, alumina, alumina sol, kaolin, talc, mica, calcium carbonate and the like, but without limitation thereto. The average particle diameter of the particle material, though not particularly limited, is preferably in the range of 0.01–5 $\mu$m, more preferably of 0.05–3 $\mu$m, most preferably of 0.08–2 $\mu$m. The mixing ratio of particle material to all resins in the adhesive layer is set to be preferably in the range of 0.05–8 parts by weight, more preferably of 0.1–3 parts by weight, as determined by the weight of solid contents, but the ratio specified here should not be construed as restrictive.

The crosslinking agent optionally incorporated in the adhesive layer is chosen from urea resin, melamine resin, acrylamide resin and polyamide resin, all being methylolated or alkylolated, an epoxy compound, an isocyanate compound, an oxazoline compound, an aziridine compound, various silane coupling agents, various titanate coupling agents and the like, but without limitation thereto. The amount of the crosslinking agent to be added, though not particularly limited, preferably in the range of 0.5–20 parts by weight, more preferably of 1–15 parts by weight, most preferably of 2–10 parts by weight, based on the weight of all the resins contained in the adhesive layer.

The resins used for formation of the adhesive layer may be used after being dissolved or dispersed in organic solvent or water. In particular, in view of economy, uniformity and adhesion to a substrate, the adhesive polyester film used herein can preferably be obtained by means of inline coating that is effected at one process step in the production line of polyester films. Preferred, therefore, are dissolved or dispersed resins.

The thickness of the adhesive layer is set preferably in the range of 0.02–5 $\mu$m, more preferably of 0.03–2 $\mu$m, most preferably of 0.05–0.5 $\mu$m, which should not be considered restrictive. Too small a thickness in the adhesive layer sometimes poses unacceptable bondability to various paints and inks.

One preferred form of a process for the production of the biaxially oriented polyester film of the present invention will now be illustrated and described. This process, however, should not be construed as limiting to the invention.

Firstly, a particle material is caused to be contained in a film-constituting PPT polymer. To this end, though not restricted, there may be illustrated a method in which a propanediol slurry as a particle material is polymerized with an acid component such as terephthalic acid, or a method in which an aqueous slurry of a particle material is mixed and kneaded with a selected shape of PPT pellets with a biaxial kneading extruder of a vented type.

The content of the particle material may effectively be adjusted by preparing a master of high concentration with use of one of the above method, followed by dilution of the master with a substantially particle-free polymer during film formation.

The resultant polymer pellets are then dried and supplied to a melt extruder where the pellet is extruded from a slit die into the shape of a sheet. This sheet is cooled and solidified on a casting roll, whereby an unoriented film is prepared. At this stage, the melted polyester is brought into laminated condition by use of a plurality of extruders, a plurality of manifolds or an intermixing block.

Subsequently, the unoriented film is biaxially stretched and biaxially oriented. Stretching may be carried out by means of successive biaxial stretching or simultaneous biaxial stretching. More effectively, a lengthwise direction and a widthwise direction are subjected in that order to successive biaxial stretching. Immediately before lengthwise stretching, heat treatment is done at a temperature of 60° C.–150° C. for a length of time of 1 second–20 seconds, and this heat treatment is greatly conducive to the heat shrinkage and characteristic aspects inherent to the present invention. Lengthwise stretching at three separate stages is effective for attaining the heat shrinkage according to the invention. The lengthwise stretching temperature set at 50–180° C., the lengthwise to widthwise stretching factor at 2.5–6.0 times, and the lengthwise to widthwise stretching speed at 5,000–50,000%/minute can be illustrated as preferred. To gain the characteristic aspects according to the invention, the stretching speed is set at 20000%/minute in particular. Widthwise stretching is conducted by use of a tenter at a stretching temperature of 50–180° C., at a widthwise stretching factor of 3.0–6.5 times that is set to be larger than a lengthwise stretching factor, and at a widthwise stretching speed of 1,000–20,000%/minute. When it is found necessary, restretching may further be done in the lengthwise and widthwise directions. Lengthwise restretching is effected at 50–180° C. and at a stretching factor of 1.1–2.0 times, whereas widthwise restretching is effected by use of a tenter at a stretching temperature of 50–180° C. and at a widthwise stretching factor of 1.1–2.0.

Then, the biaxially oriented film obtained above is heat-treated under constant tension. Heat treatment is effected at a temperature of 120–250° C., particularly of 150–230° C., and for a length of time of 0.5–60 seconds. Upon completion of the heat treatment, the resultant film is introduced in an intermediate cooling zone where it is slowly cooled at an intermediate cooling temperature of 60° C.–150° C. for 1 second–60seconds. This intermediate cooling effectively leads to the heat shrinkage according to the present invention. Where either one of the lengthwise and widthwise directions is restretched, heat treatment is once again conducted, subsequently to the intermediate cooling, at a relaxation ratio of less than 3% and at a temperature of 60° C.–130° C. for a period of time of 0.5–60 seconds so that heat shrinkage and Young's moduli can be well balanced as desired in the invention.

[Measurement Methods of Physical Properties and Evaluation Methods of Beneficial Effects]

Those characteristic values and beneficial effects exhibited by the present invention are determined in accordance with the following measurement methods and the following evaluation methods.

(1) Average Particle Diameter of Particles and Number of Particles (Y)

A polyester is removed from a test film by means of plasma ashing, whereby particles are caused to expose from external view. Plasma ashing conditions are so selected that despite the polymer ashed, the particles can be protected almost completely from being impaired. Observation is made of the particles by a scanning electron microscope (SEM), and the resultant particle images are treated by an image analyzer. The magnification of SEM is set to be approximately 2000–10000 times, and the field in single measurement is chosen from about 10–50 μm in one side. In terms of more than 5000 particles in number observed at varied locations, the volume-average diameter d is determined by the particle diameter and volume fraction and by the following equation.

$$d = \Sigma di \cdot Nvi$$

where di denotes the particle diameter, and Nvi denotes the volume fraction.

When the particles are of an organic nature and are apt to become greatly impaired due to plasma ashing at low temperature, the following method may be employed.

The film is observed in cross section by a transmission electron microscope at a magnification of 3000–100000 times. The thickness of a slice for TEM inspection is set at about 100 nm and measured at a field of more than 500 at varied locations. The volume-average particle diameter d is obtained from the above equation.

(2) Number of Protrusions (X) and Ratio of Crystal-Induced Protrusions

A film is observed in cross section by a transmission electron microscope and at a magnification of 3000–200000 times. The thickness of a slice for TEM inspection is set at about 100 nm and measured at a field of more than 500 at varied locations. Both the number of protrusions in all and the number of protrusions induced from particles are counted, from which the ratio of protrusions induced from crystals is determined.

Alternatively, the film is etched with use of a suitable solvent in the direction of thickness and under the protrusions to be checked. When insoluble matter remains as such having defined the protrusions, it is taken as a particle material having been extraneously added or internally separated (I). When insoluble matter is absent or negligibly small if present, the protrusions are presumed to have been derived from fine crystals (II). As the above solvent, a good example is a mixed solvent of phenol/carbon tetrachloride (weight ratio: 6/4). In this way and with a field of 1 mm² set, the frequencies of I and II are determined. The value of II/(I+II) may be used as the ratio of crystal-induced protrusions. Here, I+II is expressed as the number of protrusions X.

(3) Content of Particles

Compositional analysis is made by means of the microscopic FT-IR method (Fourier's transformation microscopy infrared spectroscopy). The content of particles is based on the ratio of peak arising from a carbonyl group in a polyester to peak arising from materials other than the polyester. In order to convert the peak height ratio to the corresponding weight ratio, the ratio of polyester weight to a total weight of polyester plus other materials is determined from a calibration curve prepared in advance with use of samples of known weights. An X-ray microanalyzer may also be employed when found necessary. In the case where a solvent can be selectively used which dissolves a polyester, but does not dissolve a particle material, the polyester is dissolved, and the particle material is separated centrifugal from the polyester. Thus, the weight percentage of the particle material is determined.

Additionally, the content of particles in a surface zone of a test film is determined as follows; that is, the film is slit into the form of a tape of ½ inch in width and then brought into perpendicularly intimate contact with a single-edged knife on a surface of the tape where polyester A has been laminated. With the knife edge forced into the tape by 0.5 mm; the tape is then traveled at a distance of 20 cm (traveling tension: 500 g and traveling speed: 6.7 cm/second). Subsequent measurement is made, by means of the above method of determining the content of particles, of the content of particles in suchmatter as having been rubbed off the tape surface and attached to the knife edge.

(4) Heat Shrinkage

A 15 cm long, 1 cm wide film is placed without its ends fixed and measured as to its dimensional changes in the lengthwise and widthwise directions after standing for 30 minutes at 80° C. If a dimensional change is small, but if a measurement accuracy of 0.1% or below is necessary, then enlargement is done by a universal projector. A large numerical value in either one of the lengthwise and widthwise directions is taken as the heat shrinkage of the film.

(5) Surface Roughness Ra, 10-Point Average Roughness Rz and Protrusion-Protrusion Spacing Sm The surface roughness Ra, 10-point average roughness Rz and protrusion-protrusion spacing Sm of a film are measured by the use of a high-precision film-flatness measuring device, ET-10, manufactured by Kosaka Laboratories. The measuring conditions are given below, and 20 cycles of measurement are conducted while the film is being scanned widthwise, after which the resultant numerical values are averaged.

radius of feeler tip: 0.5 μm
load of feeler: 5 mg
length of measurement: 1 mm
cut-off value: 0.08 mm The definitions of Ra, Rz, Sm and the like are disclosed for instance in "Methods for Measurement and Evaluation of Surface Roughness" edited by Jiro NARA (General Technical Center, 1983).

(6) Thickness of Film Laminate

A laminate film is observed cross-sectionally at an accelerating voltage of 100 kV with use of a transmission electron microscope (H-600Type manufactured by Hitachi Ltd.) and by means of a ultra slicing method (Ru04 dyeing). The interface of the laminate is captured, from which the thickness of the laminate is determined. Magnifications are not particularly restricted since they are usually chosen depending on the thickness of laminates to be measured. However, 1 tens of thousands–10 tens of thousands are suitable.

In the alternative, a depth distribution of particle concentrations is determined by means of a secondary ion qualitative analyzer, X-ray photoelectron spectroscopy, infrared spectroscopy or a constant focal microscope. The maximum value in the direction of depth is determined on the basis of the particle surface, and a depth found equivalent to ½ of the maximum value is taken as the thickness of the laminate.

(7) Crystallization Parameter ΔTcg

A film is slit into the form of a ½ inch wide tape and then brought into perpendicularly intimate contact with a single-edged knife. With the knife edge forced into the tape by 0.5 mm, the tape was then traveled at a distance of 20 cm (traveling tension: 500 g and traveling speed: 6.7 cm/second). Matter rubbed off the tape surface and attached to the knife edge was collected in an amount of 10 mg, which matter is used as a sample. When rubbed matter comes short of 10 mg in single traveling, another fresh film is treated in the same manner as mentioned above in order to prepare a total of 10 mg of a sample.

Measurement is made with DSC (differential scanning calorimeter). An amount of 10 mg of the sample is set in a DSC device and melted at 300° C. for 5 minutes, followed by quenching of the melt in liquid nitrogen. The resultant specimen is heated at 10° C./minute and checked in respect of its glass transition point Tg. Temperature rise is continued, and a crystallizing exothermic peak temperature derived from a glass state is taken as a cold crystallization temperature Tcc, and an endothermic peak temperature derived from crystal fusion is taken as a fusion temperature Tm. Likewise, a crystallizing exothermic peak temperature derived from during temperature drop is taken as a crystallization temperature in temperature drop Tmc. The difference between Tcc and Tg (Tcc−Tg) is defined as the crystallization index ΔTcg.

(8) Oligomer Preclusion

A film is allowed to stand in an oven at 150° C. for 30 minutes, thereby forcibly separating oligomeric matter on the film surface. After being deposited with aluminum, the resultant film surface is photographed by a differential interference microscope at an overall magnification of 400 times. Observation is made in 25 fields on the photograph. The number of oligomers is counted at each of the fields, and the total number is taken as the number of surface-separated oligomers (piece/mm$^2$). Less than 80 pieces/mm$^2$ in number and smaller than 1 mm in size on the photograph are adjudged to be excellent, and more than 80 pieces/mm$^2$ but less than 100 pieces/mm$^2$ in number and smaller than 1 mm in size are adjudged to be good. More than 100 pieces/mm$^2$ in number, or larger than 1.5 mm in size is adjudged to be bad.

(9) Wear Resistance

A film slit to a width of ½ inch is allowed to travel on a guide pin (surface roughness Ra 100 nm) with use of a tape traveling tester (traveling speed 500 m/minute, traveling cycle 1, winding angle 60° and traveling tension 30 g). Scratches on the film is microscopically examined. Less than 3 flaws of 2.5 μm or above per tape width is adjudged to be excellent. Less than 10 flaws is good and more than 10 flaws bad.

In the case of a film of more than 30 μm in overall thickness, traveling is effected on a guide pin (surface roughness Ra 100 nm) with a tape traveling tester in the same manner as is done above, but except that traveling speed 2 m/minute, winding angle 90° and traveling tension 200 g are used. Evaluation is made by like judgements.

(10) Modulus

JIS K-7127 is followed. Measurement is made at 25° C. and at 65% RH by the use of a tensile tester manufactured by Toyo Instruments Co. A sample is cut to a 10 mm wide, 200 mm long strip in the direction of measurement, and the chuck-to-chuck space at initial tensile is 100 mm and tensile speed 300 mm/minute.

(11) Adhesiveness

As an ultraviolet-curable ink, a FLASH DRY FD-OL black (manufactured by Toyo Ink Manufacturing Co., Ltd.), is used and coated on a film in a thickness of 2 μm by means of roll coating. Subsequently, the ultraviolet-curable ink is cured by irradiation with an ultraviolet lamp (80 W/cm and 5 seconds)

Adhesiveness is evaluated by cross-cutting the ink-cured film at a number of 100 in an area of 1 mm$^2$ and by bonding a cellophane tape over the cross-cut film and pressing the tape against the tape with use of a rubber roll (3 strokes at a load of 19.6 N), followed by releasing of the tape at an angle of 90 degrees. A mode of 4-grade evaluation is used (⊙: 100, ○: 80–99, Δ: 50–79 and ×: 0–49).

(12) Haze

Haze is measured by use of a full-automatic direct-reading haze computer, HGM-2DP, (for C light source) (Suga Instruments Co., Ltd.). Evaluation is made by the average of 10-point measurements.

haze: H (%)=(Td/Tt )×100

Td (%)=[{T4−T3×(T2/T1)}/T1]×100 (diffused transmission)

Tt (%)=(T3/T1)×100 (transmission of all light rays)

(T1: incident light, T2: all transmitted light, diffused light of device T4: diffused transmitted light)

(13) Haze after Forced Heating

A film to be tested is fixed to a metal frame with binding clips and allowed to stand in a hot-air oven at 80° C. for 3 days. The haze of this film is determined by the method itemized above as (1).

(14) Output Characteristics (C/N)

Over a film according to the present invention is disposed, in the presence of a trace of oxygen, a deposited layer of a cobalt-nickel alloy (Ni 20% by weight) in a thickness of 200 nm. A carbon-protective film is further formed on the deposited surface in conventional fashion and then slit to a width of 8 mm, whereby a pan cake is prepared. Next, the pan cake is assembled in a length of 200 m into a cassette so as to provide a cassette tape.

The resultant cassette tape is applied to a commercially available VTR device for Hi 8 (EV-BS3000 manufactured by Sony Corporation). C/N is measured at 7 MHz±1 MHz.

The C/N value thus obtained is compared to that of a commercial cassette tape (120-minute ME) for Hi 8 and evaluated as follows:

+more than 3 dB: excellent

+1–+3 dB: good

+less than 1 dB: bad

When being higher in a range of more than +1 dB than those of a commercial video tape (120-minute ME) for Hi 8, the output characteristics are acceptably useful for VTR tapes of a digital recording system.

(15) Wear Resistance and Friction Coefficient

A film is slit into the form of a tape of ½ inch in width and caused to travel on a stainless steel-made guide pin (surface roughness: 100 nm by Ra) with use of a tape traveling tester (traveling speed: 250 m/minute, winding angle: 60°, inlet-side tension 50 g and traveling cycle 1).

Initial μk is determined by the following equation.

$$\mu k = 3/\pi \ln(T/50)$$

where T denotes the tension on an outlet side. Less than 0.3 in μk is judged to be acceptably slidable and more than 0.3 unacceptably slidable. The μk value of 0.3 is a critical point at which inconveniences would be liable to occur due to inadequate slidability at working steps, for example, at a printing step.

EXAMPLES

With reference to the following examples, the present invention will now be described in relation to its embodiments.

Example 1

PPT was produced by ester exchange reaction and polycondensation reaction of dimethyl terephthalate and 1,3-propanediol.

PPT pellets were vacuum-dried (3 Torr) at 120° C. for 8 hours, and PET pellets were vacuum-dried (3 Torr) at 180° C. for 8 hours. Polymer A: a PPT polymer and polymer B: a PET polymer containing 0.1% by weight of calcium carbonate particles of 0.8 μm in particle diameter were put in an extruder 1 and an extruder 2, respectively, and melted at 265° C. and at 280° C., respectively. After being filtered with high precision, both of the polymers were laminated at a rectangular intermixing portion into three-layered formation (A/B/A).

By use of electrostatic casting, the resultant laminate was wound around a casting drum of 20° C. in surface temperature so that the laminate was cooled and solidified to prepare a non-stretched film. In this instance, the ratio of gap of cap slit/ thickness of non-stretched film was set at 10. Moreover, the discharge of each of the extruders was controlled to adjust the overall thickness of the non-stretched film and the thickness of the associated layer A.

This non-stretched was stretched 3.5 times in a lengthwise direction and at a temperature of 96° C. Stretching was effected at four stages, each stage using two pairs of rolls worked at varying peripheral speeds. The film so stretched monoaxially was stretched 3.6 times in a widthwise direction, at a temperature of 100° C. and with use of a tenter, followed by heat treatment under constant tension at 220° C. for 3 seconds. In that way, a biaxially oriented film was obtained which had an overall thickness of 6.3 μm and provided with a layer A of 0.3 μm in thickness. The characteristics of this biaxially oriented polyester film are shown in Table 1, and the wear resistance has been found to be good.

Example 2

A biaxially oriented polyester film was produced with use of the same polymer A as used in Example 1, PET changed to contain an amount of 0.1% by weight of divinyl benzene particles of 0.8 μm in particle diameter, and the laminate thickness changed to be at 1.0 μm. The characteristics of this polyester film are shown in Table 1, and the wear resistance has been found to be good.

Example 3

The procedure of Example 1 was repeated except that the thickness of the layer A of a PPT polymer was changed to 0.05 μm, whereby a biaxially oriented polyester film was provided. The characteristics of this polyester film are shown in Table 1, and the wear resistance has been found to be good.

Comparative Example 1

A biaxially oriented polyester film was provided by using those materials used in Example 1, but by changing the film structure, laminate thickness, stretching conditions and the like. The characteristics of this polyester film are shown in Table 1, and the wear resistance has been proved to be bad.

Comparative Example 2

A biaxially oriented polyester film was obtained by using the polymer A of Example 1 for use in the layer A, and a substantially particle-free PET polymer for use in the layer B, but by changing the laminate thickness, stretching conditions and the like. The characteristics of this polyester film are shown in Table 1, and the wear resistance has been proved to be bad.

Comparative Example 3

A biaxially oriented polyester film was obtained by use of the polymer B of Example 1, which film was of a single-layered structure and was 10 μm in thickness. The characteristics of this polyester film are shown in Table 1, and the wear resistance has been proved to be bad.

TABLE 1

| | Laminate portion (layer A) polymer | Heat shrinkage (80° C., 30 min) (%) | Film structure Thickness of layer A (μm) | Wear resistance |
|---|---|---|---|---|
| Example 1 | Polypropylene terephthalate | 0.31 | A/B/A 0.3 | Good |
| Example 2 | Polypropylene terephthalate | 0.35 | A/B/A 1.0 | Good |
| Example 3 | Polypropylene terephthalate | 0.29 | A/B/A 0.05 | Good |
| Comparative Example 1 | Polypropylene terephthalate | 0.85 | A/B 4 | Bad |
| Comparative Example 2 | Polyethylene terephthalate | 0.42 | A/B/A 0.8 | Bad |
| Comparative Example 3 | Polyethylene terephthalate | 0.35 | Single layer 10 | Bad |

Example 4

PPT was produced by ester exchange reaction and polycondensation reaction of dimethyl terephthalate and 1,3-propanediol. Then, an aqueous slurry of aluminum silicate particles was prepared, which particles were synthesized by reacting sodium silicate and sodium aluminate in an aqueous system by a wet method and had an aluminum ratio of 20% by weight in terms of aluminum oxide. This aqueous slurry was mixed with and kneaded in PPT pellets.

The particle-containing PPT pellets were mixed with substantially particle-free PPT pellets in their respective appropriate amounts and then vacuum-dried (3 Torr) at 120° C. for 8 hours. Polymer A: a PPT polymer containing 0.2% by weight of aluminum silicate particles of 0.17 μm in particle diameter and polymer B: a PET polymer containing 0.1% by weight of calcium carbonate particles of 0.8 μm in particle diameter were put in an extruder 1 and an extruder 2, respectively, and melted at 260° C. and at 280° C., respectively. After being filtered with high precision, both of the polymers were laminated at a rectangular intermixing portion into two-layered formation (A/B).

With use of static casting, the resultant laminate was wound around a casting drum having a surface temperature of 20° C., whereby the laminate was cooled and solidified to form a non-stretched film. In this instance, the ratio of gap of cap slit/thickness of non-stretched film was set at 10. Further, the discharge of each of the extruders was controlled to adjust the overall thickness of the non-stretched film and the thickness of the associated layer A.

This non-stretched film was stretched 3.5 times in a lengthwise direction and at a temperature of 93° C. Stretching was effected at three stages, each stage using two pairs of rolls worked at varying peripheral speeds. The film so stretched monoaxially was stretched 4.8 times in a widthwise direction, at a temperature of 95° C. and with use of a tenter, followed by heat treatment under constant tension at 220° C. for 3 seconds and subsequent treatment in an intermediate cooling zone at 120° C. for 7 seconds. Thus, a biaxially oriented polyester film was obtained which had an overall thickness of 11 μm and provided with a layer A of 0.3 μm thick layer A. The characteristics of this biaxially oriented polyester film are shown in Table 2, and the wear resistance and oligomer preclusion have been found excellent.

films of the present invention have been excellent in respect of wear resistance and oligomer preclusion.

TABLE 2

|  | Polymer of laminate portion (layer A) | Particle Particle diameter (μm) Content (wt %) | Heat shrinkage (80° C., 30 min) (%) | Young's modulus lengthwise/ widthwise (ratio) | Film structure thickness of layer A (μm) | Wear resistance | Oligomer preclusion |
|---|---|---|---|---|---|---|---|
| Example 4 | Polypropylene terephthalate | Aluminum silicate 0.17 0.2 | 0.31 | 4.5/4.8 (0.93) | A/B 0.3 | Excellent | Excellent |
| Example 5 | Polypropylene terephthalate | Calcium carbonate 0.8 0.1 | 0.35 | 4.8/4.9 (0.97) | A/B/A 1.0 | Excellent | Excellent |
| Example 6 | Polypropylene terephthalate | Aluminum silicate 0.03 0.7 | 0.36 | 5.2/5.2 (1.0) | A/B/C 0.05 | Excellent | Excellent |
| Example 7 | Polypropylene terephthalate | Absent | 0.36 | 5.2/4.2 (1.23) | A/B/A 0.1 | Excellent | Excellent |
| Example 8 | Polypropylene terephthalate | Absent | 0.32 | 4.9/5.6 (0.88) | A/B/A 0.5 | Excellent | Excellent |
| Example 9 | Polypropylene terephthalate | Absent | 0.38 | 5.5/6.5 (0.85) | A/B/A 0.3 | Excellent | Excellent |
| Comparative Example 4 | Polypropylene terephthalate | Aluminum silicate 0.17 0.005 | 0.82 | 4.8/7.2 (0.67) | A/B 3 | Bad | Excellent |
| Comparative Example 5 | Polyethylene terephthalate | Silica 0.5 0.5 | 0.42 | 4.3/6.2 (0.69) | A/B/A 0.8 | Bad | Bad |

Examples 5 and 6 and Comparative Examples 4 and 5

Biaxially oriented polyester films were produced in the same manner as in Example 4, but with the use of varied kinds, particle diameters and contents of particles, varied thickness of laminates and the like. In Example 6, polymer C for use in a layer C was the particle-free PPT polymer as in Example 1, and the laminate thickness was 1 μm. As is clear from Table 2, the films of Examples 5 and 6 are excellent in respect of wear resistance and oligomer preclusion. The films of Comparative Examples 4 and 5 are not Good as Regards These Characteristics

Examples 7–9

Biaxially oriented polyester films each of 7 μm in overall thickness were provided in which the PPT polymer of Example 1 had been used as polymer A, polymer B had been composed of a PET polymer containing 0.1% by weight of crosslinkable divinyl benzene particles of 0.6 μm in average particle diameter, and changes had been made to the particle diameters, contents and contents of particles, thickness of laminates, stretching conditions and the like. As evidenced from the results of Table 2, the biaxially oriented polyester

Example 10

PET pellets 1 (IV 0.72) were derived from polymerization in conventional manner and dried in vacuum (3 Torr) at 185° C. for 3 hours. Pellets 2 (IV 0.95) were also prepared by ester exchange reaction and polycondensation reaction of dimethyl terephthalate and 1,3-propanediol and dried in vacuum (3 Torr) at 140° C. for 3 hours. Additionally, pellets 3 were prepared by polymerizing PET with an inert particle material (average particle diameter: colloidal silica particles of 0.25 μm in average particle diameter, added in a content of 0.5% by weight during polymerization, and IV 0.65) and dried in vacuum (3 Torr) at 185° C. for 3 hours.

Upon drying of each of the pellets 1 and the pellets 2, 19.7% by weight of the particle-free PET pellets 1, 80% by weight of the PPT pellets 2 and 0.3% by weight of the particle-containing PET pellets 3 were mixed to prepare polyester A, and the PET pellets 1 were used as polyester B. The two polyesters were supplied to two extruders. Polyester A was melted in the extruder 1 at 265° C., while polyester B was melted in the extruder 2 at 290° C. Both melts were laminated together in a rectangular intermixing block (feed block) for use in three-layered lamination and, by means of electrostatic casting, was caused to wind around a casting drum of 22° C. in surface temperature and to cool and solidify as it was. Thus, a non-stretched laminated film was formed which was of a three-layered structure of A/B/A. Prior to stretching, this non-stretched film was preheated by passage through four silicone rolls each of 85° C. in surface temperature. In addition, the film so preheated was stretched 3.2 times in a lengthwise direction at 95° C., then stretched 4.0 times in a widthwise direction at 95° C. with use of a known tenter and again stretched 1.3 times in the lengthwise direction at 90° C. Heat treatment was subsequently effected under constant tension at 220° C. for 5 seconds, followed by treatment in an intermediate cooling zone at 120° C. for 7 seconds. Heat treatment was once again conducted in a relaxation ratio of 2% at 100° C. for 3 seconds. Thus, a biaxially oriented polyester film was provided which had a lamination thickness of 1 μm and an overall thickness of 12 μm.

Examples 11 and 12

Biaxially oriented polyester films were provided in the same manner as done in Example 10 and with the use of polymers for layers A formulated in those ratios shown in Table 3. These polyester films were formed with varied particle diameters, extrusion melting temperatures, stretching temperatures and the like. In Example 11, stretching was effected 4.5 times in a lengthwise direction at four separate stages and 4.0 times in a widthwise direction. In Example 12, stretching was effected 4.8 times in a lengthwise direction at four separate stages and 4.0 times in a widthwise direction.

Comparative Examples 6–8

As polyester A, use was made of those prepared by mixing PET pellets 1, PPT pellets 2 and particle-containing PET pellets 3 in those ratios shown in Table 3. In the same manner as done in Example 11 but with stretching temperatures and stretching percentages varied, biaxially oriented laminated polyester films were formed which had an overall thickness of 12 μm (thickness on one side of layer A: 1 μm and 3.5 μm in Comparative Example 8).

Performance evaluation was made of the films prepared in Examples 10–12 and Comparative Examples 6–8 with the results tabulated in Table 3. All the samples within the scope of the present invention have been excellent in oligomer preclusion and dimensional stability as compared to the comparative samples.

Example 13

PPT was derived from ester exchange reaction and polycondensation of dimethyl terephthalate and 1,3-propanediol.

Upon drying of PPT pellets in vacuum (3 Torr) at 120° C. for 8 hours, polymer A: a PPT polymer and polymer B: a substantially particle-free polyethylene terephthalate polymer were put in an extruder 1 and an extruder 2, respectively, and melted at 260° C. and at 280° C., respectively. After being filtered with high precision, the two polymers were laminated at a rectangular intermixing portion into three-layered arrangement (A/B/A)

By means of electrostatic casting, the resultant laminate was wound around a casting drum of 20° C. in surface temperature, and cooled and solidified as it was, whereby a non-stretched film was formed. In such instance, the ratio of gap of cap slit/thickness of non-stretched film was set to be 10. The discharge of each of the extruders was also controlled to adjust the overall thickness of the film and the thickness of the layer A.

This non-stretched film was heat-treated on silicone rolls at a treating temperature of 85° C. for a period of time of 10 seconds and then stretched 3.3 times in a lengthwise direction at a stretching temperature of 93° C. and at a stretching speed of 10000%/minute. Stretching was effected at three stages, each stage using two pairs of rolls worked at varying peripheral speeds. The film so monoaxially stretched was stretched 3.5 times in a widthwise direction at 96° C. with use of a tenter and further stretched 1.1 times in the widthwise direction at 95° C. Heat treatment was then effected under constant tension at 220° C. for 3 seconds, followed by treatment in an intermediate cooling zone at 120° C. for 7 seconds. Heat treatment was once again conducted with a relaxation ratio of 2% at 100° C. for 3 seconds. Thus, a biaxially oriented polyester film was provided which had an overall thickness of 5 μm and a thickness of 1.0 μm in the layer A. The characteristics of this polyester film are shown in Table 4, and the wear resistance has been found excellent.

TABLE 3

| | Composition of layer A (wt %) | | | Film structure (μm) | Lengthwise stretching condition preheating/stretching temperature (° C.) | Lengthwise Young's modulus E (Gpa) | Heat shrinkage S (80° C., 30 min) (%) | 0.08E−S | Oligomer preclusion | dimensional stability |
|---|---|---|---|---|---|---|---|---|---|---|
| | PET | PPT | Particle | | | | | | | |
| Example 10 | 19.7 | 80 | Silica 0.3 | A/B/A 1/10/1 | 85/95 | 6.3 | 0.41 | 0.094 | Good | Excellent |
| Example 11 | 9.75 | 90 | Silica 0.25 | A/B/A 1/10/1 | 80/85 | 5.6 | 0.36 | 0.088 | Excellent | Excellent |
| Example 12 | 19.75 | 80 | Silica 0.25 | A/B/A 1/10/1 | 85/90 | 5.8 | 0.37 | 0.094 | Good | Excellent |
| Comparative Example 6 | 99.8 | Absent | Silica 0.2 | A/B/A 1/10/1 | 85/93 | 5.2 | 0.35 | 0.066 | Bad | Bad |
| Comparative Example 7 | 59.8 | 40 | Silica 0.2 | A/B/A 1/10/1 | 70/85 | 4.1 | 0.29 | 0.038 | Bad | Bad |
| Comparative Example 8 | 10 | 90 | Absent | A/B/A 3.5/5/3.5 | 80/90 | 5.5 | 0.82 | −0.38 | Excellent | Bad |

TABLE 4

| | Laminate portion (layer A) polymer | Lengthwise stretching (° C.) Preheating temp. Stretching temp. | Heat shrinkage (80° C., 30 min) (%) | Average roughness Ra (nm) Rz/Ra Protrusion spacing Sm (μm) | Film structure Thickness of layer A (μm) | Wear resistance |
|---|---|---|---|---|---|---|
| Example 13 | Polypropylene terephthalate (no particle added) | 85 90 | 0.35 | 25 8.5 9.0 | A/B/A 1.0 | Excellent |

TABLE 4-continued

| | Laminate portion (layer A) polymer | Lengthwise stretching (° C.) Preheating temp. Stretching temp. | Heat shrinkage (80° C., 30 min) (%) | Average roughness Ra (nm) Rz/Ra Protrusion spacing Sm (μm) | Film structure Thickness of layer A (μm) | Wear resistance |
|---|---|---|---|---|---|---|
| Example 14 | Polypropylene terephthalate (no particle added) | 90 95 | 0.31 | 30 9.0 9.2 | A/B 0.5 | Excellent |
| Example 15 | Polypropylene terephthalate (no particle added) | 95 93 | 0.33 | 20 8.0 8.2 | A/B/A 0.2 | Excellent |
| Comparative Example 9 | Polypropylene terephthalate/ Polyethylene terephthalate (50/50) (no particle added) | 70 90 | 0.54 | 4 15 40 | A/B/A 1.0 | Bad |
| Comparative Example 10 | Polyethylene terephthalate (particle diameter: 0.8 μm calcium carbonate: 0.1 wt %) | 85 90 | 0.33 | 15 16 12 | A/B/A 2.0 | Bad |
| Comparative Example 11 | Polyethylene terephthalate (particle diameter: 0.8 μm calcium carbonate: 0.1 wt %) | 90 95 | 0.35 | 16 20 35 | Single layer 10 | Bad |

Examples 14 and 15 and Comparative Examples 9–11

Biaxially oriented polyester films were provided in the same manner as done in Example 1 but with PPT laminating thickness, lengthwise stretching temperatures and the like made variable. As is evident from Table 4, the polyester films within the scope of the present invention are excellent in wear resistance, whereas the other comparative films are unacceptable in that respect.

Example 16

PPT was derived from ester exchange reaction and polycondensation reaction of dimethyl terephthalate and 1,3-propanediol.

Upon drying of PPT pellets in vacuum (3 Torr) at 120° C. for 8 hours, polymer A: a PPT polymer and polymer B: a PET polymer containing 0.1% by weight of calcium carbonate particles of 0.8 μm in particle diameter were charged in an extruder 1 and in an extruder 2, respectively, and melted at 260° C. and at 280° C., respectively. After being filtered with high precision, the two melts were laminated at a rectangular intermixing portion into three-layered formation (A/B/A).

By means of electrostatic casting, the resultant laminate was wound around a casting drum of 20° C. in surface temperature, and cooled solidified as it was. Thus, a non-stretched film was formed. In such instance, the ratio of gap of cap slit/thickness of non-stretched film was set at 10. The discharge of each of the extruders was also controlled to adjust the overall thickness of the film and the thickness of the layer A.

The non-stretched film thus formed was stretched 3.5 times in a lengthwise direction at a preheating temperature of 85° and at a stretching temperature of 90° C. Stretching was effected at three stages, each stage using two pairs of rolls worked at varying peripheral speeds. The film so monoaxially stretched was stretched 3.5 times in a widthwise direction at 100° C. with use of a tenter, followed by heat treatment under constant tension at 220° C. for 10 seconds, whereby a biaxially oriented film was provided with an overall thickness of 60 μm and a thickness of 1.0 μm in the layer A. The characteristics of this biaxially oriented polyester film are shown in Table 5, and the wear resistance has been found excellent.

Examples 17 and 18 and Comparative Example 12

Biaxially oriented polyester films were obtained in the same manner as done in Example 16 but with polymer types in laminated portions, laminating thickness, lengthwise stretching temperatures and the like made variable. As is apparent from Table 5, the biaxially oriented polyester films of Examples 17 and 18 exhibit excellent wear resistance, but that of Comparative Example 12 reveals inadequate wear resistance.

TABLE 5

| | Laminate portion (layer A) polymer | Heat shrinkage (80° C., 30 min) (%) | Layer A Crystallization parameter ΔTcg (° C.) | Film structure Thickness (μm) | Wear resistance |
|---|---|---|---|---|---|
| Example 16 | Polypropylene terephthalate | 0.28 | 30 | A/B/A 1/58/1 | Excellent |

TABLE 5-continued

|  | Laminate portion (layer A) polymer | Heat shrinkage (80° C., 30 min) (%) | Layer A Crystallization parameter ΔTcg (° C.) | Film structure Thickness (μm) | Wear resistance |
|---|---|---|---|---|---|
| Example 17 | Polypropylene terephthalate | 0.32 | 33 | A/B 2/58 | Excellent |
| Example 18 | Polypropylene terephthalate | 0.25 | 33 | A/B/C 0.5/58.5/1 | Excellent |
| Comparative Example 12 | Polypropylene terephthalate | 0.83 | 32 | A/B/A 10/25/10 | Bad |

Example 19

As thermoplastic polymers B and C, a PET polymer was used which resulted from a conventional mode of polymerization and did not substantially contain a particle material. For a polymer layer A, a PPT polymer (IV 0.93) was used which did not contain a particle material. The two polymers were dried for 3 hours, respectively, at 180° C. and at 120° C. With use of three known extruders, melt extrusion was effected at 260° C. (polymer layer A), at 280° C. (polymer layer B) and at 290° C. (polymer layer C) The melts were laminated together at a rectangular intermixing block (feed block) for use in three-layered lamination, and by means of electrostatic casting, the laminate was caused to wind around a metallic casting drum of 20° C. in surface temperature so that the laminate was cooled and solidified. Thus, a non-stretched film was formed which was of a five-layered structure of B/A/C/A/B.

This non-stretched film was heat-treated on silicone rolls at a treating temperature of 140° C. for a period of time of 5 seconds and, while being passed through the rolls, was stretched 3.8 times in a lengthwise direction at four or separate stages at a stretching temperature of 95° C. and at a stretching speed of 10000%/minute and further stretched 5.2 times in a widthwise direction at a stretching temperature of 100° C and at a stretching speed of 5000%/minute with use of a conventional tenter. Heat treatment was then conducted under constant tension at 220° C. for 3 seconds, followed by treatment in an intermediate cooling zone at 120° C. for 7 seconds. Thus, a biaxially oriented laminated film was provided which had an overall thickness of 7 μm, a thickness of 0.05 μm in the layer B and a thickness of 0.5 μm in the PPT laminated layer.

Examples 20 and 21

Biaxially oriented polyester films of a five-layered laminated structure were formed in the same manner as in Example 19 but with the use of varying laminating thickness of layers A and B and stretching conditions.

Example 22

The same manner as in Example 19 was followed. As the thermoplastic polymer C, a PET recycling polymer (containing 0.05 wt. % of calcium carbonate particles of 0.6 μm in particle diameter and 0.3 wt. % of colloidal silica particles of 0.3 μm in particle diameter) was put to use. On both sides was laminated, in a thickness of 0.8 μm, PPT of 1.0 in IV as a polymer for a layer A, and for a layer B, polymer pellets of PET were also prepared which contained 2 wt. % of δ type alumina particles of 20 nm in primary particle diameter. These pellets were diluted with the particle-free polymer pellets of PET used in Example 1 such that the concentration of particles was set at 0.3 wt. % in the layer B. Thus, a biaxially oriented laminated film was produced which was of a five-layered structure with an overall thickness of 7 μm.

TABLE 6

|  | Laminate structure | Thickness of layer A (μm) | Thickness of layer B (μm) | Thickness of layer C (μm) | Ta/Tb (%) | Surface roughness (nm) | Heat shrinkage (80° C., 30 min) | TD Young's modulus (Gpa) | Wear resistance | Oligomer preclusion |
|---|---|---|---|---|---|---|---|---|---|---|
| Example 19 | B/A/C/A/B | 0.5 | 0.05 | 5.9 | 0.1 | 20 | 0.52 | 5.5 | Good | Good |
| Example 20 | B/A/C/A/B | 0.5 | 0.03 | 5.9 | 0.06 | 23 | 0.53 | 5.8 | Good | Excellent |
| Example 21 | B/A/C/A/B | 0.8 | 0.03 | 5.3 | 0.04 | 25 | 0.41 | 5.0 | Good | Excellent |
| Example 22 | B/A/C/A/B | 0.8 | 0.03 | 5.3 | 0.04 | 24 | 0.61 | 6.5 | Good | Excellent |
| Example 23 | B/A/C | 0.5 | 0.05 | 4.5 | 0.1 | 28 | 0.46 | 5.6 | Good | Good |

Example 23

Polymer pellets of PET were prepared which contained 2 wt. % of silicon particles having an average particle diameter of 0.8 μm. These pellets were diluted with particle-free polymer pellets such that the content in a layer C was set to be 0.3 wt. %, whereby polymer pellets were obtained for use as a thermoplastic polymer C. For a layer A, use was made of the substantially particle-free PPT (IV 0.93) employed in Example 1, and for a layer B, polymer pellets were used in which alumina were contained (0.3 wt. %). With use of three extruders to provide B/A/C formation, a biaxially oriented laminated film was produced which was of three-layered structure having an overall thickness of 5 μm and provided with a 0.5 μm thick layer A and a 0.05 μm thick layer B.

The characteristics of the films obtained in Examples 19–23 are shown in Table 6. All these films are excellent in regard to oligomer preclusion and abrasion resistance.

Examples 24–26 and Comparative Examples 13 and 14

A PET polymer, a PPT polymer and a polymer blend of PPT with PET (90:10) were used, all of which had been derived in known manner. In the case where particles were added, polyethylene terephthalate or polypropylene terephthalate were used which were obtainable by use of a conventional mode of polymerization and by use of particle-containing ethylene glycol or 1,3-propylene glycol.

The starting pellets each were dried for 3 hours at their respective suitable temperatures in the range of 120–180° C. With use of three known extruders, melt extrusion was effected at 260° C., at 280° C. and at 265° C., respectively, and the melts were laminated at a rectangular intermixing block (feed block) for use in three-layered lamination in such a manner that those laminate structures tabulated in Table 7 could be attained. The resultant laminate was caused, by means of electrostatic casting, to wind around a metallic casting drum of 20° C. in surface temperature and to cool and solidify as it was. Thus, a non-stretched film was formed.

This non-stretched film was heat-treated at 85° C. on conventional silicone rubber rolls and, while being passed through the rolls, was stretched 3.8 times in a lengthwise direction at three or more stages, at a stretching speed of 20000%/minute and at a stretching temperature of 93° C. and further stretched 3.8 times in a widthwise direction at 100° C. with use of a known tenter. When it was found necessary, widthwise stretching was conducted once again, followed by heat treatment under constant tension at 220° C. for 3 seconds and by subsequent treatment in an intermediate cooling zone at 120° C. for 7 seconds. Thus, biaxially oriented laminated films were produced with those thickness shown in Table 7.

A metal deposit was disposed on the surface of a third layer. In the Examples, the films have been found attainable with adequate centerline average roughness Ra and desirable protrusion-protrusion spacing Sm and hence with excellent output characteristics and traveling capability. The films of Comparative Examples 13 and 14 are inferior in those properties.

structure. The resultant laminate was caused, by means of electrostatic casting, to wind around a casting drum of 22° C. in surface temperature and to cool and solidify as it was, whereby a non-stretched film was formed. This non-stretched film was stretched 3.5 times in a lengthwise direction at a temperature of 95° C. The resultant film was subjected to atmospheric corona discharging on one side thereof where PPT had been disposed so that an adhesive layer-forming coating solution a was coated over the corona-discharged surface. The monoaxially stretched film thus coated was introduced, while being clamped with clips, in a preheating zone where it was heated at 110° C., and successively continuously stretched 3.5 times in a widthwise direction in that preheating zone. Heat treatment was then effected at 225° C., followed by treatment in an intermediate cooling zone at 120° C. for 7 seconds. Thus, a highly adhesive polyester film was produced as desired.

In such polyester film, the substrate film of PET was 49.5 μm thick, the PPT layer 0.5 μm and the adhesive layer 0.15 μm.

The results obtained are shown in Table 8. The haze after forced heating has been prevented from being increased, and the adhesiveness is excellent.

Adhesive layer-forming coating solution a: aqueous coating solution composed of polyester resins (2 kinds) consisting of those components indicated below and glycol components, and a crosslinking agent.

| polyester resin A | 50 parts by weight | |
|---|---|---|
| acid components | terephthalic acid | 50 mol % |
| | isophthalic acid | 25 mol % |
| | sebacic acid | 24 mol % |

TABLE 7

| | Polymer of laminate portion 1st layer/2nd layer/3rd layer | Heat shrinkage (80° C., 30 min) (%) | 1st layer Average roughness Ra (nm) Protrusion spacing Sm (μm) | 3rd layer Ra (nm) Sm (μm) | Film structure Laminate thickness (μm) | Traveling capability | Output characteristic |
|---|---|---|---|---|---|---|---|
| Example 24 | PPT/PET/PP · PET (90:10) | 0.35 | 25 9.0 | 5 13 | A/B/C 0.5/5/0.5 | Good | Good |
| Example 25 | PPT/PET/PPT | 0.31 | 23 9.2 | 7 12 | A/B/A 1/4.8/0.2 | Excellent | Excellent |
| Example 26 | PPT/PET/PPT 1st layer: silica: 0.8 μm content: 0.02 wt % | 0.53 | 20 9.2 | 7 13 | A/B/A 0.8/4.4/0.8 | Excellent | Good |
| Comparative Example 13 | PPT/PET 2nd layer: calcium carbonate: 0.8 μm content: 0.02 wt % | 0.58 | 5 16 | 16 18 | A/B 0.2/5.8 | Good | Bad |
| Comparative Example 14 | PPT/PET/PPT | 0.39 | 18 9.6 | 18 9.6 | A/B/A 1/4/1 | Good | Bad |

Example 27

Polymer A: PET containing 0.015% by weight of colloidal silica of 0.4 μm in average particle diameter and 0.005% by weight of colloidal silica of 1.5 μm in average particle diameter, and polymer B: PPT were sufficiently dried in vacuum. Polymer A was supplied to an extruder 1 and polymer B to an extruder 2, and melted at 280° C. and at 260° C., respectively. After being filtered with high precision, the two polymers were melt-extruded at a rectangular intermixing portion into a two-layered laminated -continued

| | 5-sodium sulfonyl itaconate | 1 mol % |
|---|---|---|
| glycol components | ethylene glycol | 55 mol % |
| | neopentyl glycol | 45 mol % |
| polyester resin B | 50 parts by weight | |
| acid components | terephthalic acid | 87.5 mol % |
| | 5-sodium sulfonyl | 12.5 mol % |

-continued

| | | |
|---|---|---|
| glycol component | isophthalate ethylene glycol | 100 mol % |
| methylolated melamine crosslinking agent | 5 parts by weight | |

Those components were mixed to meet the ratios of solid contents specified above and diluted with water to a solid content concentration of 5% by weight.

TABLE 8

| | PPT layer | | | | | Haze (%) | | |
|---|---|---|---|---|---|---|---|---|
| | PPT ratio (wt %) | Thickness (μm) | Heat shrinkage (%) (80° C., 30 min) | Average roughness Ra (nm) Rz/Ra Protrusion spacing Sm (μm) | Adhesive layer | Before forced heating | After forced heating | Adhesiveness |
| Example 27 | 100 | 0.5 | 0.29 | 35<br>8.2<br>13 | a | 1.0 | 1.4 | ⊚ |

Industrial Applicability

The biaxially oriented polyester film according to the present invention is excellent in wear resistance and oligomer preclusion, and therefore, is useful for magnetic recording media.

What is claimed is:

1. A biaxially oriented polyester film characterized in that said polyester film comprises at least one film layer composed predominantly of polypropylene terephthalate and has a heat shrinkage of 0.8% or below after standing at 80° C. for 30 minutes, wherein said polyester film has an X/Y ratio of 5 or above where X denoted the number of protrusions defined on the surface of said propylene terephthalate-predominated film layer, and Y denotes the number of particles contained in said propylene terephthalate-predominated film layer.

2. A biaxially oriented polyester film according to claim 1, wherein said polypropylene terephthalate-predominated film layer has a thickness of 0.01–3.0 μm.

3. A biaxially oriented polyester film according to claim 1 or 2, wherein said polypropylene terephthalate-predominated film layer comprises 60–99.9% by weight of polypropylene terephthalate and 40–0.1% by weight of polyethylene terephthalate.

4. A biaxially oriented polyester film according to claim 1 or 2, wherein said polypropylene terephthalate-predominated film layer contains 0.01–3% by weight of a particle material having an average particle diameter of 0.01–2.0 μm.

5. A biaxially oriented polyester film according to claim 4, wherein said polyester film meets the equation of 0.2 d≦t≦10 d where t denotes the thickness (nm) of said polypropylene terephthalate-predominated film layer, and d denotes the average particle diameter (nm) of said particle material contained in said film layer.

6. A biaxially oriented polyester film comprising at least one film layer composed predominantly of polypropylene terephthalate, at least one surface of said polypropylene terephthalate-predominated film layer having a surface roughness Ra of 5–120 nm, a 10-point average roughness Rz/Ra of 12 or below and a protrusion-to-protrusion spacing Sm of 15 μm or below.

7. A biaxially oriented polyester film according to claim 6, wherein said polypropylene terephthalate-predominated film layer has a thickness of 0.01–3.0 μm.

8. A biaxially oriented polyester film according to claim 6 or 7, wherein said polypropylene terephthalate-predominated film layer comprises 60–99.9% by weight of polypropylene terephthalate and 40–0.1% by weight of polyethylene terephthalate.

9. A biaxially oriented polyester film according to claim 6 or 7, wherein said polypropylene terephthalate-predominated film layer contains 0.01–3% by weight of a particle material having an average particle diameter of 0.01–2.0 μm.

10. A biaxially oriented polyester film according to claim 9, wherein said polyester film meets the equation of 0.2 d≦t≦10 d where t denotes the thickness (nm) of said polypropylene terephthalate-predominated film layer, and d denotes the average particle diameter (nm) of said particle material contained in said propylene terephthalate-predominated film layer.

11. A biaxially oriented polyester film according to claim 6, wherein said polyester film has an X/Y ratio of 5 or above where X denoted the number of protrusions defined on the surface of said propylene terephthalate-predominated film layer, and Y denotes the number of particles contained in said propylene terephthalate-predominated film layer.

12. A biaxially oriented polyester film according to claim 1 or 6, wherein said polyester film has a Young's modulus of 4.5 GPa or above in the lengthwise and widthwise directions thereof.

13. A biaxially oriented polyester film according to claim 1 or 6, wherein the ratio of Young' modulus in the lengthwise direction to Young's modulus in the widthwise direction (lengthwise Young's modulus/widthwise Young's modulus) is in the range of 0.7–1.5.

14. A biaxially oriented polyester film according to claim 1 or 6, wherein said polyester film meets the equation of 0.08 E–S≧0.08 where E denotes the modulus (GPa) in the lengthwise direction, and S denotes the heat shrinkage (%) in the lengthwise direction.

15. A biaxially oriented laminated polyester film according to claim 1 or 6, wherein said polyester film has an overall thickness of 50–100 μm.

16. A biaxially oriented laminated polyester film characterized in that said polyester film has a laminate structure comprising three or more film layers and provided with two outermost film layers each formed of a film layer composed predominantly of polypropylene terephthalate, wherein one of said two outermost film layers has a centerline surface roughness Ra of 9 nm or below and a surface protrusion-to-protrusion spacing Sm of 15 μm or below, and the other outermost film layer has a centerline surface roughness between 9 nm or above and 30 nm or below, a surface protrusion-to-protrusion spacing Sm of 15 μm or below and a heat shrinkage of 0.8% or below after standing at 80° C. for 30 minutes.

17. A biaxially oriented laminated polyester film having a laminate structure of at least three layers comprising a polymer layer composed of predominantly of polypropylene terephthalate, layer A, a polymer layer comprised of a thermoplastic resin B, layer B and a polymer comprised of a thermoplastic resin C, layer C, wherein said layer A is disposed on at least one surface of said layer C, said layer B is disposed on at least one surface of said layer A, said layer A has a thickness of less than 1 mm, and said layers A and B meet the equation:

$$0.01 \leq Tb/Ta < 1$$

where Ta denotes the thickness of said layer A, and Tb denotes the thickness of said layer B.

18. A biaxially oriented polyester film according to claim 17, wherein the thickness of said layer C is larger than 50% of the overall thickness of said polyester film.

19. A biaxially oriented polyester film according to claim 17 or 18, wherein said thermoplastic resin C is polyethylene terephthalate.

20. A biaxially oriented polyester film according to any one of claims 1, 6, 16 and 17, wherein said polyester film further includes an adhesive layer disposed on at least one surface thereof.

* * * * *

UNITED STATES PATENT AND TRADEMARK OFFICE
CERTIFICATE OF CORRECTION

PATENT NO. : 6,331,344 B1
DATED : December 18, 2001
INVENTOR(S) : Okazaki et al.

It is certified that error appears in the above-identified patent and that said Letters Patent is hereby corrected as shown below:

Column 25,
Lines 37-38, change "propylene terephthalate-predominated film layer" to
-- polypropylene terephthalate-predominated film layer --.

Column 26,
Line 26, change "propylene terephthalate-predominated film layer" to
-- polypropylene terephthalate-predominated film layer --.
Lines 33-34, change "propylene terephthalate-predominated film layer" to
-- polypropylene terephthalate-predominated film layer --.

Signed and Sealed this

Twelfth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,331,344 B1 Page 1 of 1
DATED : December 18, 2001
INVENTOR(S) : Okazaki et al.

It is certified that error appears in the above-identified patent and that said Letters Patent is hereby corrected as shown below:

Column 25,
Lines 37 and 39, change "propylene" to -- polypropylene --.

Column 26,
Lines 28, 33 and 35, change "propylene" to -- polypropylene --.

Signed and Sealed this

Fourteenth Day of September, 2004

JON W. DUDAS
*Director of the United States Patent and Trademark Office*